(12) United States Patent
Meynard et al.

(10) Patent No.: US 8,564,238 B2
(45) Date of Patent: Oct. 22, 2013

(54) DEVICE WITH A POLYPHASE ELECTRICAL MACHINE, AND RELATED ELECTRICAL MACHINE

(75) Inventors: Thierry Meynard, Toulouse (FR); Anne-Marie Lienhardt, Toulouse (FR); Vincent Devanneaux, Toulouse (FR); Pierre Brodeau, Toulouse (FR); Regis Ruelland, Saint Loup Cammas (FR); Jean-Pierre Carayon, Toulouse (FR)

(73) Assignees: Liebherr-Aerospace Toulouse SAS, Toulouse (FR); Institut National Polytechnique de Toulouse, Toulouse (FR); Centre National de la Recherche Scientifique (C.N.R.S.), Paris (FR)

(*) Notice: Subject to any disclaimer, the term of this patent is extended or adjusted under 35 U.S.C. 154(b) by 186 days.

(21) Appl. No.: 13/139,409

(22) PCT Filed: Dec. 9, 2009

(86) PCT No.: PCT/FR2009/052466
§ 371 (c)(1),
(2), (4) Date: Jun. 13, 2011

(87) PCT Pub. No.: WO2010/067021
PCT Pub. Date: Jun. 17, 2010

(65) Prior Publication Data
US 2011/0241591 A1   Oct. 6, 2011

(30) Foreign Application Priority Data
Dec. 11, 2008   (FR) .................................... 08 06964

(51) Int. Cl.
  *H02P 1/32*   (2006.01)
(52) U.S. Cl.
  USPC ............................................. 318/496; 363/71

(58) Field of Classification Search
  USPC ................. 318/106, 430, 496, 778, 801, 807; 363/34, 71, 89, 131
  See application file for complete search history.

(56) References Cited

U.S. PATENT DOCUMENTS

| 7,109,681 B2 | 9/2006 | Baker et al. | |
| 2004/0160201 A1* | 8/2004 | Rahman et al. | 318/41 |
| 2008/0150455 A1* | 6/2008 | Shinmura et al. | 318/85 |

FOREIGN PATENT DOCUMENTS

| EP | 1 052 769 A2 | 11/2000 |
| JP | 63 305793 A | 12/1988 |

(Continued)

OTHER PUBLICATIONS

Translation of JP07-067310 use in office action.*

(Continued)

*Primary Examiner* — Eduardo Colon Santana
*Assistant Examiner* — Iftekhar Mustafa
(74) *Attorney, Agent, or Firm* — Young & Thompson

(57) ABSTRACT

The invention relates to a device having a polyphase electrical machine, wherein a plurality of inverters (36, 37, 38), which are controlled by an interlaced control modulated by pulse width to an identical cutoff frequency, provide, on the phase outputs thereof, an alternating voltage signal having an identical fundamental frequency, amplitude and phase to an electrical machine (2) that comprises at least two separate so-called star windings (33, 34, 35), each star winding being supplied by a related inverter, each phase output of which is connected to a phase circuit that includes the phase winding of the star winding, the device being characterized in that each phase circuit for a star winding has a negative mutual inductance with the homologous phase circuit of another star winding.

4 Claims, 2 Drawing Sheets

(56) References Cited

FOREIGN PATENT DOCUMENTS

JP     9 182394 A     7/1997
JP    2000 324892 A    11/2000

OTHER PUBLICATIONS

Annette von Jouanne et al.: "A Dual-Bridge Inverter Approach to Eliminating Common-Mode Voltages and Bearing and Leakage Currents", IEEE Transactions on Power Electronics, vol. 14, No. 1, Jan. 1999, XP011043271, ISSN: 0885-8993, p. 46, right-hand column; figures 3, 5.

International Search Report, dated Oct. 18, 2010, from corresponding PCT application.

* cited by examiner

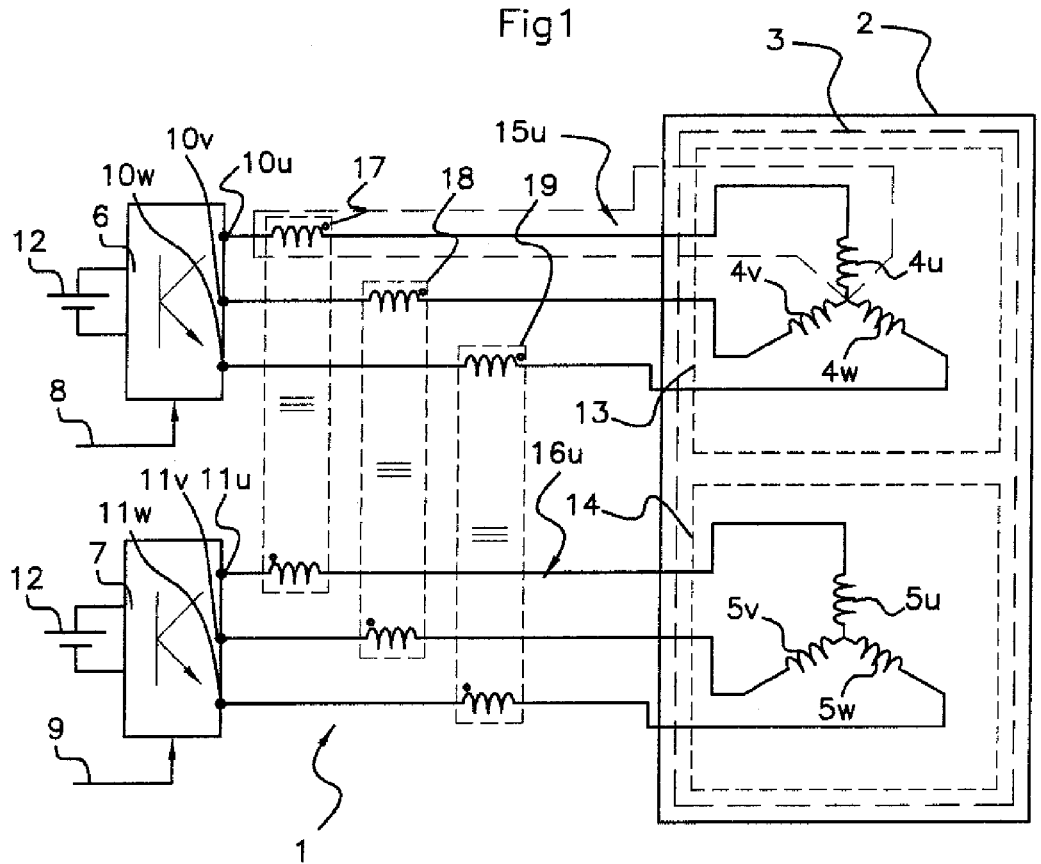
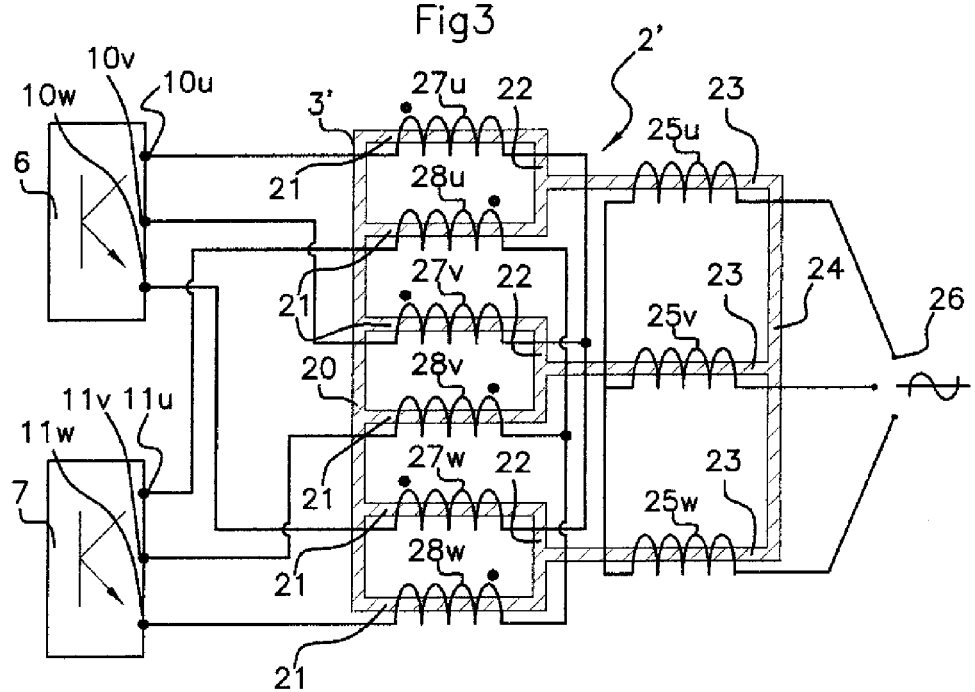

DEVICE WITH A POLYPHASE ELECTRICAL MACHINE, AND RELATED ELECTRICAL MACHINE

The invention relates to a device having a polyphase electrical machine, wherein a plurality of electronic inverters, which are controlled by a pulse width modulation signal, supply respectively a plurality of connected sub-machines. The invention also relates to an electrical machine which comprises multiple sub-machines, and which is suitable for functioning in such a device.

BACKGROUND OF THE INVENTION

Use of mono or polyphase inverters, supplied from a source of direct or rectified current, to supply an alternating current to an electrical machine such as a synchronous motor for example, so as to be able to vary its speed, is known. In general, these inverters include electronic switches, such as insulated gate bipolar transistors (IGBT), which are fitted in a bridge and make it possible to connect an output of the inverter alternately to the positive and negative poles of the power supply. These inverters are in general controlled by a rectangular signal of fixed frequency (cutoff frequency), the pulse width of which is modulated to recreate a signal of quasi-sinusoidal form at the output of the inverter.

It is often advantageous to use several inverters in parallel, to limit the amperage of the currents produced by each inverter (and therefore the size and cost of the components which constitute it), and/or for purposes of redundancy, or even, thanks to a so-called interlaced control, in which the control signals of the different inverters are offset relative to each other, to limit the disturbances which are applied to the source of direct current at the time of the current surge produced by simultaneous switching of the transistors.

From the document U.S. Pat. No. 7,109,681 for example, a device for controlling a conventional synchronous motor from two three-phase inverters producing a signal in phase with the fundamental frequency is known. The inverters are controlled by chopped control signals phase-shifted by 180° relative to each other. This phase shift causes disturbances which are superimposed on the power supply signal of the motor at the fundamental frequency, and are filtered in the resulting signal by the combination of the signals of the two inverters in the interphase transformers of which, for each phase, the ends are connected respectively to each output of the inverters, and the midpoint is connected to the motor.

However, it is sometimes necessary, e.g. because of questions of redundancy at the level of the electrical machine itself, to use a machine formed out of several connected sub-machines, such as, in the example of a synchronous motor, a motor including multiple independent stator windings mounted in a star. These motors are usually called n-star motors, where n corresponds to the number of distinct stator windings.

When they associated an inverter with each sub-machine and controlled the inverters by an interlaced control, the inventors noticed that the known disturbances of the alternating control signal of the motor, which were known and attributed to instantaneous circulation of currents between the outputs of the inverters, which were connected galvanically in the prior art, were also present in this assembly, where the inverters are insulated galvanically from each other.

It was also noticed that these disturbances caused disturbing currents in the motor, generating heat and losses of yield by Joule effect, Foucault currents and hysteresis, for example.

SUMMARY OF THE INVENTION

The invention is therefore aimed at solving this problem, without in any way sacrificing the galvanic insulation of the various inverter/sub-machine assemblies, as it would have been with the solution of the prior art.

The invention is aimed at providing a device with an electrical machine, making it possible to use a power supply which is divided by inverters with interlaced control, with present-day electrical machines without the need to modify them, and alternatively to provide a modified electrical machine which does not have these problems of losses, in a device with multiple inverters in parallel.

To do this, the invention concerns a device with a polyphase electrical machine, of the type including:
  an electrical machine, comprising at least:
    a carcase of ferromagnetic material, forming a magnetic circuit,
    a coil winding of conductive wire, including at least one winding element per phase, the winding elements being suitable to be connected to each other according to a star structure,
  a control device including multiple inverters, which are suitable for:
    being supplied with direct or rectified current,
    being controlled by an interlaced pulse-width-modulated control to an identical cutoff frequency between the inverters,
    providing, on their phase outputs, an alternating voltage signal having an identical fundamental frequency, amplitude and phase between the homologous phase outputs of each inverter, characterized in that:
  the coil winding includes at least two distinct groups of winding elements, called star windings, each including, for each phase, a phase winding consisting of at least one winding element, the phase windings of each star winding being connected to each other according to a star structure,
  each star winding is supplied with power by at least one associated inverter, which is connected by its respective phase outputs to a phase circuit including the respective phase windings of the star winding,
  each phase circuit of a star winding has a negative mutual inductance with the homologous phase circuit of another star winding.

The thus achieved negative coupling between the homologous phase circuits of the machine makes it possible to minimise the interfering circulation of currents in the branches of the inverters corresponding to the homologous phases, caused by the transistors being switched at different instants.

Advantageously and according to a first embodiment of the invention, for each pair of star windings, the phase circuits include, in series with the homologous phase windings of said star windings, respectively the primary and the secondary of a coupling transformer having negative coupling between primary and secondary, said coupling being suitable for forming, in combination with the respective coupling of the homologous phase windings of said star windings, a resulting negative mutual inductance.

Thus, by an external coupler, it is possible to compensate for the generally positive coupling which is found in present-day multi-star machines between the homologous phase windings, said coupling causing interfering differential circulation of current, which is superimposed on the signal at the fundamental frequency. The negative coupling between the homologous phase circuits is obtained without sacrificing the galvanic insulation of the circuits from each other, thanks to the coupling transformer.

Advantageously and according to a second embodiment of the invention, the phase outputs of the inverters are connected directly to the respective phase windings of the star windings of the electrical machine, and the coil winding of the latter in the carcase is implemented so that the homologous phase windings of the star windings, taken two by two, have a negative mutual inductance.

Thus, once it is possible to implement the coil winding of the electrical machine, an appropriate coil winding makes it possible to implement the desired negative coupling, and to dispense with an external coupler.

Advantageously and according to the invention, the electrical machine is a motor or a generator, including:
- a stator comprising a cylindrical carcase including longitudinal slots parallel to the axis of the carcase, regularly distributed on its periphery,
- a number p of pairs of poles, an integer multiple of a number n of star windings,
- a coil winding of conductive wires, according to which, for each phase, the same number p of winding elements, of the same number of turns, are wound in the slots of the carcase according to the same winding direction,
    - each winding element intercepting, between its parallel branches, an angular sector corresponding approximately to $$\frac{\pi}{p},$$

- each winding element being offset angularly relative to the previous one by an angular pitch of $$\frac{2\pi}{p},$$

- the phase winding of each star winding being implemented by p/n distinct winding elements, which are connected according to the same serial-parallel combination.

It should be noted that for each star winding, the phase windings corresponding to the different phases are deduced from the phase windings of a previous phase by an angular offset of $$\frac{2\pi}{m \times n},$$

where m corresponds to the number of phases of the power supply, and n to the number of star windings of the machine.

Advantageously and according to the invention, the electrical machine is a motor or generator including a cylindrical carcase with regularly distributed slots, and the homologous phase windings of two star windings are wound according to the same direction of rotation, in slots offset by e/n slots, where e is the number of slots of the carcase, and n is the number of star windings of the machine.

Advantageously and according to the invention, the electrical machine is a voltage transformer, including:
- a ferromagnetic carcase comprising
    - one intermediate core per phase, comprising multiple primary cores connected by an intermediate yoke to a secondary core,
    - a primary yoke closing a primary magnetic circuit consisting of the primary cores of all the phases of the carcase,
    - a secondary yoke closing a secondary magnetic circuit consisting of the secondary cores of all the phases of the carcase,
- a coil winding of conductive wire, including
    - at least one secondary winding per phase, wound around each secondary core, of which one of the ends is connected to the other secondary windings in a common neutral conductor, and the other end is connected to an output terminal of the transformer,
    - one primary winding per phase and per inverter, wound around a primary core of the corresponding phase, the primary windings being wound according to the same winding direction on their core, and the primary windings of the phases of the same inverter being connected at one end in a common neutral conductor, and at the other end to the respective phase outputs of the inverters.

The invention also extends to a multi-star electric motor which is suitable for functioning with multiple inverters controlled by fixed frequency, pulse-width-modulated control signals, of the type comprising a stator including a cylindrical carcase with regularly distributed slots and a rotor with permanent magnets, characterized in that it includes as many pairs of poles as star windings, and in that the homologous phase windings of two star windings are wound according to the same direction of rotation, in slots offset by e/n slots, where e is the number of slots of the carcase and n is the number of star windings of the machine.

The invention also concerns a device with an electrical machine and an electric motor, characterized in combination by all or some of the characteristics mentioned above or below.

BRIEF DESCRIPTION OF THE DRAWINGS

Other aims, characteristics and advantages of the invention will appear on reading the following description and the attached drawings, in which:

FIG. 1 shows a device according to a first embodiment of the invention, including a three-phase two-star machine powered by two inverters via an external coupler, FIG. 3 shows schematically a device according to the second embodiment of the invention, applied to a three-phase two-star transformer powered by two inverters.

DETAILED DESCRIPTION OF THE PREFERRED EMBODIMENTS

Figure 2:
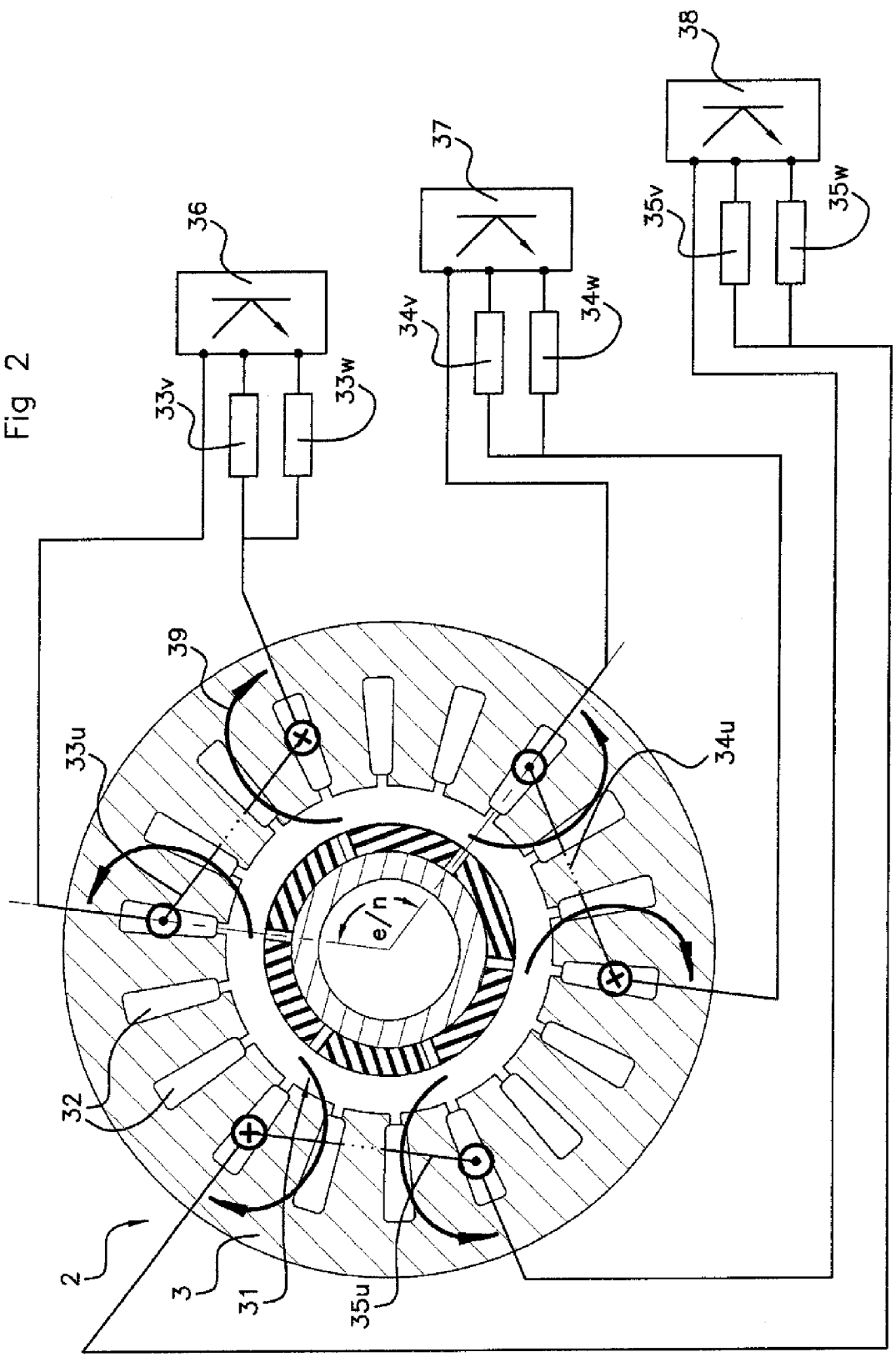
FIG. 2 shows a device according to a second embodiment of the invention, showing the coil winding of the windings of one of the three phases of a three-phase three-star motor.

In the following description, "electrical machine" designates not only a machine in the strict sense, which transforms electrical energy into mechanical energy (motor) or vice versa (generator), but also and by extension a device which is capable of transforming electrical energy in a first form into electrical energy in a second form, using the electromagnetic properties of a variable electric current in one or more conductive turns, such as a voltage transformer for example.

Similarly, "coil winding" designates the set of electrical conductors, usually of copper wires insulated by a varnish, forming the various windings and winding elements of the electrical machine or its stator, generally wound on or around a "carcase" formed of a stack of sheets of soft iron or another ferromagnetic material. According to the terminology in use in electrical engineering, the term "star winding" means a winding consisting of at least one winding element (set of turns formed from the same length of conductive wire) per phase, these winding elements being connected to each other at a first end in a central, so-called neutral point, and at their second end respectively to one of the phases of the power supply current. Thus in three-phase current, a star winding includes three branches, each formed of one or more winding elements which on the one hand are connected together to the neutral point, and on the other hand are connected respectively to one of the three phases usually marked by the letters u, v and w. Each of the branches of the star winding is designated below by the term "phase winding", the phase windings of multiple star windings corresponding to the same phase being called "homologous".

FIG. 1 shows a device 1, which comprises an electrical machine 2, which includes star windings 13 and 14 which are wound on the same carcase 3. The star winding 13 includes three phase windings 4u, 4v and 4w, and similarly the star winding 14 includes three phase windings 5u, 5v and 5w, which are respectively homologous to the previous ones.

As the inventors noticed, machines of this type are in general wound so that the homologous phase windings, e.g. 4u and 5u, have between them a positive mutual inductance. This is not a problem when the phase windings are powered by the same voltage, or two identical voltages which are perfectly in phase. In fact, the voltage at the terminals of the homologous phase windings is then identical at every instant, and the coupling between these phase windings causes no specific effect.

In the device considered in FIG. 1, each star winding 13, 14 is powered respectively by the phase outputs 10u, 10v 10w and 11u, 11v, 11w of an inverter 6, 7 which is specific to it. These inverters are themselves powered by sources 12 of direct or rectified current, connected to each other or independent.

The inverters 6 and 7 are controlled so as to deliver, on their homologous phase outputs 10u and 11u (respectively 10v and 11v and 10w and 11w), a power supply voltage chopped to a common cutoff frequency, consisting of voltage steps including two levels (or more according to the structure of the output stages of the inverters), forming a rectangular pulse-width-modulated signal at the cutoff frequency, aiming to recreate, by its moving average, a fundamental wave of which the frequency, amplitude and phase characteristics correspond to the desired values for power supply to the machine 2, and are identical for the homologous phase outputs of the inverters.

However, it frequently happens, in particular in the transport field, when the machine 2 is a machine on board an aircraft or train, that the inverters are powered by the same source which forms part of the on-board network. That being so, it is common to control the inverters by respective commands 8 and 9 which are said to be interlaced, that is such that the transistors of the inverters are not controlled simultaneously, to avoid introducing too much disturbance on the on-board network.

Consequently, the instantaneous voltages at the terminals of the homologous phase outputs of the inverters may be different, and if these outputs are connected directly to the respective phase windings of the star windings 13 and 14, generate differential currents in the phase windings because of their positive coupling, said currents causing losses both by Joule effect in the conductors of the windings and by hysteresis in the carcase, and causing the machine to become hot, which is prejudicial to its good operation.

Advantageously, in the device according to the invention, the phase output 10u of the inverter 6 is connected to the phase winding 4u of the star winding 13 via the primary of a coupling transformer 17, the secondary of which is in series between the phase output 11u of the inverter 7 and the phase winding 5u of the star winding 14. The winding elements of the primary and secondary of the coupling transformer 17 have the same number of turns, but are wound in such a way as to provide negative coupling between primary and secondary. Their inductance is chosen so that the phase circuit 15u, which comprises in series the primary of the coupling transformer 17 and the phase winding 4u, has a resulting negative coupling relative to the homologous phase circuit 16u, which comprises in series the secondary of the coupling transformer 17 and the phase winding 5u.

In this way, the phase outputs 10u and 11u see at their terminals phase circuits 15u and 16u, the mutual inductance of which is negative. That being so, a differential voltage at the terminals of the phase outputs 10u and 11u does not generate a circulating current in the phase windings of the electrical machine, and the negative effects of these currents are attenuated.

Similarly, the phase windings 4v and 5v are mounted in series respectively with the primary and the secondary windings of a coupling transformer 18, the primary and secondary being wound so as to have a negative coupling between them. Thus the homologous phase circuits comprising respectively the primary of the coupling transformer 18 and the phase winding 4v on the one hand, and the secondary of the coupling transformer 18 and the phase winding 5v on the other hand, have a resulting negative mutual inductance.

The same applies to the third phase w, for which the negative coupling introduced by the coupling transformer 19, in combination with the respective coupling of the phase windings 4w and 5w, forms a resulting coupling such that the homologous phase circuits have a negative mutual inductance.

It has thus been noticed that with an external coupler including the three coupling transformers 17, 18 and 19, with negative coupling, it was possible to compensate for the positive coupling of the phase windings of a classic two-star motor to make power supply and control possible from distinct inverters which are controlled by interlaced control. Additionally, the galvanic insulation between each star winding and its associated inverter is preserved, thus allowing greater operational reliability in the case that one of the sub-machines associated with each star winding has an electrical fault.

Of course, this arrangement can be extended to motors including a greater number of star windings or phases. It is then necessary to provide a coupling transformer for each phase and for each pair of star windings.

According to a second embodiment of the invention, which is particularly advantageous and preferred when the coil winding of the electrical machine is implemented on request, the external coupler of the first embodiment can be avoided with an appropriate coil winding of the machine.

For example, in FIG. 2 a three-phase electrical machine 2, including a rotor 31 with permanent magnets with three pairs of poles and a stator including three star windings wound in a carcase 3 which forms the magnetic circuit, is shown. The electrical machine 2 is powered by three inverters 36, 37 and 38. For clarity of the drawing, in the carcase 3, seen in section according to a plane orthogonal to its axis, only one phase winding 33u, 34u and 35u respectively for each star winding 33, 34 and 35 has been shown, the other phase windings 33v, 33w, 34v, 34w and 35v, 35w being shown only schematically in the drawing.

The carcase 3 is classically in the form of a stack of thin ferromagnetic sheets, which are insulated from each other by a varnish. The carcase forms, in a way which is known per se, a cylindrical hollow yoke within which the radial slots 32 are made, in a generally trapezoidal shape, extending longitudinally parallel to the axis of the carcase throughout its length, and receiving the coil winding of insulated copper wire.

In the shown example, the carcase has 18 slots. The phase windings 33u, 34u and 35u are shown in the form of a single turn, the direction of the coil winding of which is symbolised by a point or cross depending on the direction of the current at a given instant. For example, at the instant shown in the figure, the current is passing through the turn representing the phase winding 33u, going from the terminal connected to the two other windings 33v and 33w (neutral point of the star winding 33) to leave by the terminal connected to the phase output u of the inverter 36. The phase windings 34u and 35u of the two other star windings are shown using the same convention.

The relative position of the phase windings in the carcase 3 is organised so that the turns of the homologous phase windings, through which the current passes in the same direction, are offset by a number of slots equal to e/n, where e is the number of slots of the carcase and n is the number of star windings which are made in it.

Thus in the example shown in FIG. 2, the branch (marked by a point) of the phase winding 34u is offset relative to the analogous branch of the phase winding 33u by 6 slots, corresponding to the 18 slots of the carcase, divided by the three star windings which are wound there.

It can thus be noted that the phase windings of the three star windings are wound in the same direction, and that when a current of the same phase passes through them, the generated flux in each phase winding is oriented so that the field lines (symbolised by arrows 39) which are created in one winding pass through the other two windings in the opposite direction to the field lines which are created respectively in these windings by their respective current. A negative mutual inductance between the homologous phase windings is thus characterized.

Of course, in certain cases the offset of e/n slots between homologous phase windings might not correspond to a whole number of slots. In this case, it is right to implement coil windings which can include turns belonging to different windings in the same slot.

More generally, a rotating electrical machine has a negative mutual inductance between its homologous phase windings, and is therefore particularly suitable for working in association with multiple inverters which are controlled according to an interlaced pulse-width-modulated cutoff control when the coil winding rules below are observed.

The machine includes a stator, which comprises a cylindrical carcase having radial slots which extend longitudinally parallel to the axis of the carcase and are distributed regularly over its periphery, and a rotor with permanent magnets, placed coaxially to the carcase and within it.

A rotating electrical machine of which the coil winding must be suitable for working with a number n of independent inverters must include the same number of star windings, so that each inverter powers one and only one star winding. To ensure correct operation, it is desirable that the machine includes a number p of pairs of poles which is an integer multiple of the number of star windings to be implemented, so that p=k×n, where n and k are integers.

For each phase, the same number p of winding elements are wound on the carcase of the stator, while observing the same direction of coil winding and the same number of turns for each winding element. The winding elements are of approximately rectangular form, two sides being parallel to the axis of the carcase. The angular opening of each winding element, that is the angular gap between these two sides measured from the axis of the carcase, corresponds approximately to the pole pitch of the machine, so that each winding element is suitable for intercepting, via its surface, the flux generated by one of the magnets of the rotor, and therefore complies with a coil pitch corresponding to $$\frac{360°}{2p} \text{ or } \frac{\pi}{p}.$$

The successive winding elements are offset angularly relative to each other by an angular pitch of $$\frac{360°}{p}.$$

To form each phase winding of each of the n star windings of the machine, the winding elements are interconnected on the basis of $$k = \frac{p}{n}$$

elements per phase winding, while observing, as required, the same combination of connections in series or parallel of the k elements. Of course, a winding element can only belong to one and only one phase winding, but it should be noted that the k winding elements can be selected at random from among the p available elements, and that it is not necessary to observe any geometrical position rule. Thus, in the example of a machine with three star windings and six pairs of poles, six winding elements (numbered in sequence clockwise from 1 to 6) per phase are available, and must be connected together two by two, either in series or in parallel. Elements 1 and 2 can thus be interconnected to implement the phase winding u1 (phase u of star winding number 1), 3 and 5 for the phase winding u2, and finally 4 and 6 for the phase winding u3.

It should be noted that the coil winding of such a stator uses at least two slots per winding element, that is 2p slots per phase. As was seen in relation to the example shown in FIG. 2, representing a three-phase machine with three pairs of poles, including three star windings (n=p=3), this corresponds to 6 slots per phase, and thus 18 slots for a three-phase machine. In this case, the angular opening of each winding element, which is unique for each phase winding, corresponds to $$\frac{18}{2\pi} \times \frac{\pi}{p} = 3$$

slots, and the angular offset is of 6 slots between homologous phase windings.

Each phase winding of a star winding corresponding to a different phase of the power supply of the machine is deduced from the phase winding of the same star winding corresponding to the previous phase by an angular offset of $$\frac{2\pi}{m \times n},$$

where m corresponds to the number of phases of the power supply, and n to the number of star windings of the machine. Thus in the example of FIG. 2, where the three-phase machine includes three star windings (m=n=3), the angular offset to be applied for the phase winding 33v is 360° divided by 9, that is 40°, or expressed as the number of slots, 18/9 or two slots.

Of course, in the case that the carcase is an existing carcase which does not include a number of slots corresponding to the intended coil winding, the coil winding could include winding elements which share certain slots at least in part.

The device described above in relation to a rotating machine can also be extended to a transformer, e.g. a voltage-raising transformer, in which the primary part is implemented in the form of multiple windings in parallel, each of them powered by its own inverter. In the case of a transformer such as the one shown in FIG. 3, two inverters 6 and 7, similar to those of FIG. 1, by their respective phase outputs 10u, 10v and 10w on the one hand and 11u, 11v and 11w on the other hand, power the primary part of a transformer 2'. The transformer 2' includes a carcase 3' of ferromagnetic material, e.g. formed from an assembly of sheets of soft steel, consisting of a first yoke 20, called the primary yoke, to which are connected multiple primary cores 21, around which are wound respectively primary windings 27u, 27v, 27w and 28u, 28v, 28w, corresponding to the different phases u, v, w of the inverters 6 and 7. The primary cores corresponding to the two homologous primary windings 27u and 28u are connected to each other, on the side opposite the primary yoke 20, by an intermediate yoke 22. A secondary core 23 is integrated with the intermediate yoke 22 at one of its ends, and carries a phase winding 25u, corresponding to the resulting phase u at the secondary of the transformer. The two primary cores 21, the intermediate yoke 22 which connects them and the secondary core 23 form an intermediate core corresponding to one of the power supply phases of the transformer. A secondary yoke 24 closes the field lines between the ends of the secondary cores 23 of all the phases, on the opposite side to the intermediate yokes 22.

The primary windings 27u, 27v and 27w are connected at one of their ends to the phase outputs 10u, 10v and 10w of the inverter 6, and are connected together in a neutral point at the other end. The same assembly as a star winding applies to the primary windings connected to the inverter 7.

The secondary windings 25u, 25v and 25w are themselves assembled as a star winding, connected together to a neutral point at one of their ends and to a terminal 26 for connection to a downstream network (not shown) at the other.

The homologous primary windings 27u and 28u are wound on their respective cores so that they have a negative coupling between them. In this way, the fluxes generated in the primary cores under the influence of an identical common mode current in the windings 27u and 28u are channelled by the intermediate yoke 22 into the secondary core 23, whereas the differential currents associated with the phase differences of the cutoff frequencies of the inverters are filtered in the decoupling transformer formed by the two windings 27u and 28u, their primary core, the intermediate yoke 22 and the part of the primary yoke 20 corresponding to the cores under consideration.

Of course, this description is given as an illustrative example only, and the person skilled in the art can make numerous modifications to it without going outside the scope of the invention, for example by applying the teaching brought by the above description to a device including an electrical machine of generator type, in which the current generated in the multiple star windings of the generator is rectified and regulated by cutoff regulators which function with interlaced pulse width modulation control.

The invention claimed is:

1. A device (1) with a polyphase electrical machine, comprising:
   an electrical machine (2), comprising at least:
      a carcase (3) of ferromagnetic material, forming a magnetic circuit, and
      a coil winding of conductive wire, including at least one winding element per phase, the winding elements being suitable to be connected to each other according to a star structure, said coil winding including at least two distinct groups of winding elements, called star windings (13, 14), each including, for each phase, a phase winding (4u, 4v, 4w, 5u, 5v, 5w, 33u-w, 34u-w, 35u-w) consisting of at least one winding element, the phase windings of each star winding being connected to each other according to a star structure; and
   a control device including multiple inverters (6, 7, 36, 37, 38), the inverters being suitable for:
      being supplied with direct or rectified current,
      being controlled by an interlaced pulse-width-modulated control (8, 9) to an identical cutoff frequency between the inverters, and
      providing, on their phase outputs (10u, 10v, 10w; 11u, 11v, 11w), an alternating voltage signal having an identical fundamental frequency, amplitude and phase between homologous phase outputs of each inverter, each star winding being supplied with power by at least one associated inverter, which is connected by its respective phase outputs to a phase circuit including the respective phase windings of the star winding,
   wherein, for each pair of star windings, the phase circuits (15u, 16u) include, in series with the homologous phase windings of said star windings, respectively the primary and the secondary of a coupling transformer (17, 18, 19) having negative coupling between primary and secondary, said coupling being suitable for forming, in combination with the respective coupling of the homologous phase windings of said star windings, a resulting negative mutual inductance.

2. A device (1) with a polyphase electrical machine, comprising:
   an electrical machine (2), comprising at least:
      a carcase (3) of ferromagnetic material, forming a magnetic circuit, and
      a coil winding of conductive wire, including at least one winding element per phase, the winding elements being suitable to be connected to each other according to a star structure, said coil winding including at least two distinct groups of winding elements, called star windings (13, 14), each including, for each phase, a phase winding (4u, 4v, 4w, 5u, 5v, 5w, 33u-w, 34u-w, 35u-w) consisting of at least one winding element, the phase windings of each star winding being connected to each other according to a star structure; and a control device including multiple inverters (6, 7, 36, 37, 38), the inverters being suitable for:
being supplied with direct or rectified current,
being controlled by an interlaced pulse-width-modulated control (8, 9) to an identical cutoff frequency between the inverters, and
providing, on their phase outputs (10*u*, 10*v*, 10*w*; 11*u*, 11*v*, 11*w*), an alternating voltage signal having an identical fundamental frequency, amplitude and phase between the homologous phase outputs of each inverter, each star winding being supplied with power by at least one associated inverter, which is connected by its respective phase outputs to the respective phase windings of the star windings of the electrical machine,
wherein the electrical machine (2) is a motor or a generator, including:
a stator comprising a cylindrical carcase including radial slots which extend longitudinally parallel to the axis of the carcase, regularly distributed on its periphery,
a number p of pairs of poles, an integer multiple of a number n of star windings,
a coil winding of conductive wires, according to which, for each phase, the same number p of winding elements, of the same number of turns, are wound in the slots of the carcase according to the same winding direction,
each winding element intercepting, between its parallel branches, an angular sector corresponding approximately to $$\frac{\pi}{p},$$

each winding element being offset angularly relative to the previous one by an angular pitch of $$\frac{2\pi}{p},$$

the phase winding of each star winding being implemented by $$\frac{p}{n}$$

distinct winding elements, which are connected according to the same serial-parallel combination.

3. The device according to claim 2, wherein the homologous phase windings (33*u*, 34*u*, 35*u*) of the star windings are wound according to the same direction of rotation, in slots offset by $$\frac{e}{n}$$

slots, where e is the number of slots of the carcase, and n is the number of star windings of the machine.

4. A device (1) with a polyphase electrical machine, comprising:
an electrical machine (2), comprising at least:
a carcase (3) of ferromagnetic material, forming a magnetic circuit, and
a coil winding of conductive wire, including at least one winding element per phase, the winding elements being suitable to be connected to each other according to a star structure, said coil winding including at least two distinct groups of winding elements, called star windings (13, 14), each including, for each phase, a phase winding (4*u*, 4*v*, 4*w*, 5*u*, 5*v*, 5*w*, 33*u-w*, 34*u-w*, 35*u-w*) consisting of at least one winding element, the phase windings of each star winding being connected to each other according to a star structure; and
a control device including multiple inverters (6, 7, 36, 37, 38), the inverters being suitable for:
being supplied with direct or rectified current,
being controlled by an interlaced pulse-width-modulated control (8, 9) to an identical cutoff frequency between the inverters, and
providing, on their phase outputs (10*u*, 10*v*, 10*w*; 11*u*, 11*v*, 11*w*), an alternating voltage signal having an identical fundamental frequency, amplitude and phase between the homologous phase outputs of each inverter, each star winding being supplied with power by at least one associated inverter, which is connected by its respective phase outputs to the respective phase windings of the star windings of the electrical machine,
wherein the electrical machine (2) is a voltage transformer, including:
a ferromagnetic carcase (3) comprising
one intermediate core per phase, comprising multiple primary cores (21) connected by an intermediate yoke (22) to a secondary core (23),
a primary yoke (20) closing a primary magnetic circuit consisting of the primary cores of all the phases of the carcase, and
a secondary yoke (24) closing a secondary magnetic circuit consisting of the secondary cores of all the phases of the carcase, and
a coil winding of conductive wire, including
at least one secondary winding (25) per phase, wound around each secondary core, of which one of the ends is connected to the other secondary windings in a common neutral conductor, and the other end is connected to an output terminal (26) of the transformer, and
one primary winding (27*uvw*, 28*uvw*) per phase and per inverter (6, 7), wound around a primary core (21) of the corresponding phase, the primary windings being wound according to the same winding direction on their core, and the primary windings of the phases of the same inverter being connected at one end in a common neutral conductor, and at the other end to the respective phase outputs (10*uvw*, 11*uvw*) of the inverters.

* * * * *